Aug. 25, 1953 C. R. DALE 2,649,710
OIL WELL FLOWMETER
Filed Dec. 13, 1948
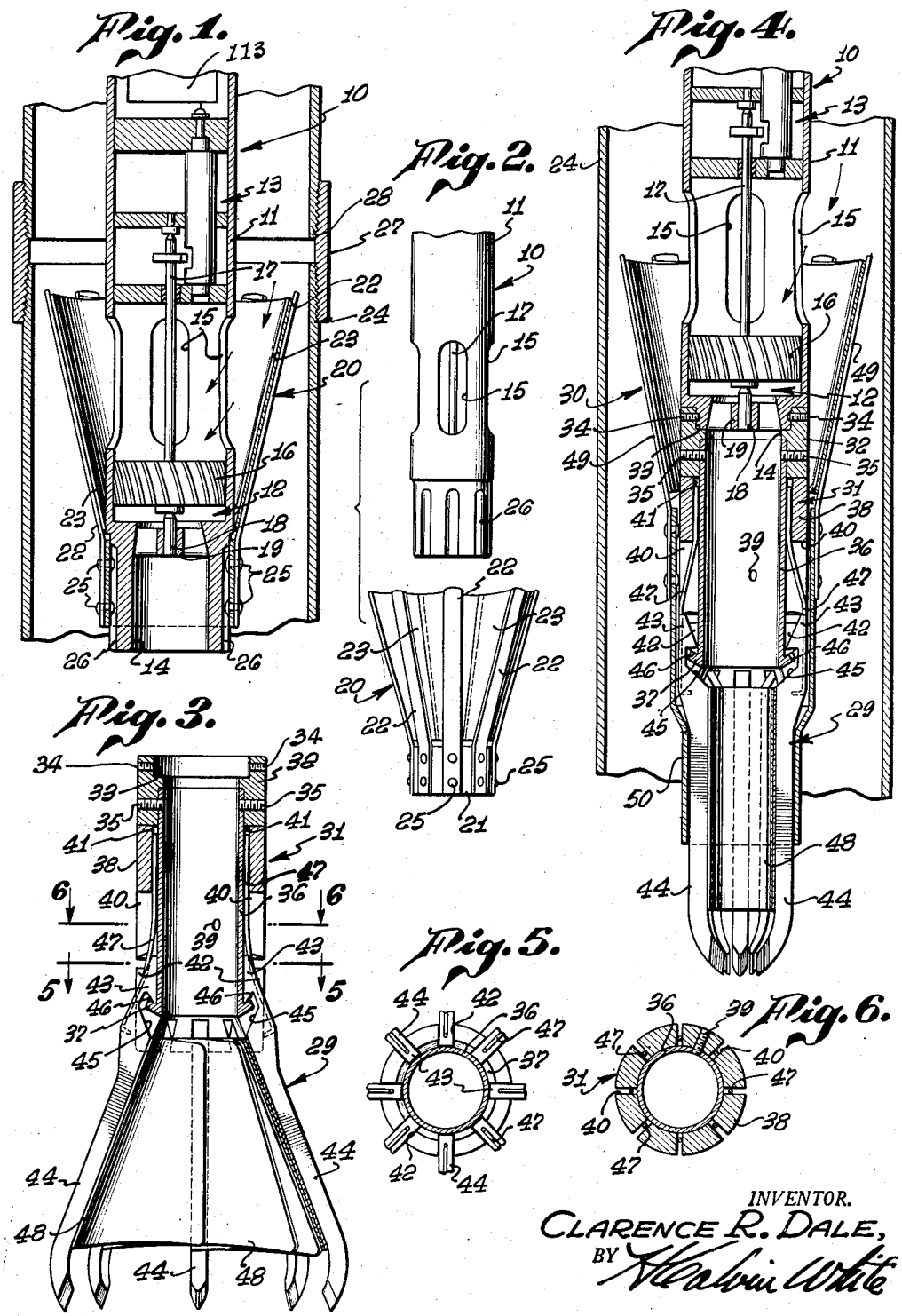
INVENTOR.
CLARENCE R. DALE,
BY
ATTORNEY.

Patented Aug. 25, 1953

2,649,710

UNITED STATES PATENT OFFICE 2,649,710

OIL WELL FLOWMETER

Clarence R. Dale, Los Angeles, Calif.

Application December 13, 1948, Serial No. 65,017

1 Claim. (Cl. 73—155)

This invention relates to instruments for determining liquid flow rates in oil wells, and is directed particularly to improvements in the type of instrument disclosed in my copending application Serial Number 778,053, filed October 6, 1947, on "Oil Well Flow Meter."

The present type of instrument may be characterized as comprising a housing structure containing a liquid flow responsive rotor, and suitable mechanism for recording in accordance with the rotor revolutions, and therefore the liquid flow rate. Typically the housing structure has bottom and side openings through which liquid flowing either upwardly or downwardly in the well is directed to contact the rotor. For present purposes it will be unnecessary to discuss the various reasons for and advantages of flow rate determinations in wells, since they are fully understood by those familiar with the art.

One of my major objects is to provide for the flow rate recordation of liquid having a downward course of flow in the well, and if desired, further to provide in the same instrument assembly for the recordation of both downward and upward flow rates. Specifically contemplated is the use of a flow director or trap carried by the instrument housing and serving to divert downward liquid flow into and through the rotor section of the instrument housing. When it may be desired to record also upward flow by the same initial assemblage of the instrument, I may include in the assembly an upper trap for deflecting the down flowing liquid and a lower trap adapted to deflect up flowing liquid against the rotor. As will appear, provision is made whereby the lower trap may be maintained in radially contracted condition while the instrument is being lowered, and subsequently released for expansion to operative condition.

The invention has various additional features and objects, such as the structural features and details of the flow traps and their association with the instrument housing. All these will be explained to best advantage by reference to the illustrated embodiments shown by the accompanying drawings, in which:

Fig. 1 is a view showing the bottom portion of a flow recording instrument and releasably attached flow trap, in vertical section;

Fig. 2 is a reduced scale view showing the same parts in elevation, with the flow trap removed from the instrument proper;

Fig. 3 shows in vertical section a form of trap attachable to the instrument for direction of upward liquid flow;

Fig. 4 is a sectional view showing both flow traps applied to the instrument with the lower trap maintained in radially contracted condition; and Figs. 5 and 6 are cross-sections taken respectively on lines 5—5 and 6—6 of Fig. 3.

The recording instrument, generally indicated at 10, typically may have the construction and operation more particularly dealt with in my copending application Serial Number 778,053. For present purposes it will suffice to refer to the instrument as comprising a tubular housing 11 containing rotor and magnetic switch mechanisms 12 and 13, the former being driven by the vertical liquid flow within the instrument, and the magnetic switch device acting to convert the rotor rotations to electrical impulses which are eventually recorded by a recorder diagrammatically represented at 113.

The tubular instrument housing 11 contains a bottom inlet opening 14, above which are positioned circularly spaced side openings 15, so that the well liquid may flow vertically through the bottom section of the instrument and either downwardly or upwardly, as the case may be. A vaned rotor 16 is mounted for rotation about a vertical axis on shaft 17 extending upwardly into the magnetic switch section of the housing. The lower end of the rotor is journaled on bearing pin 18 carried by support 19 within the inlet 14. Thus it will be seen that the rotor will turn in response to either upward or downward liquid flow between the openings 14 and 15.

The purpose of the trap, generally indicated at 20, is to direct the downward liquid flow occurring within a relatively wide area, through the openings 15 and against the rotor to thus sensitize the rotor for response to all downward flow velocities, however low. The trap 20 comprises a sleeve 21 carrying a plurality of circularly spaced upwardly and outwardly extending flexible metallic fingers 22. To the inner surface of each finger is secured a thin freely flexible metallic vane 23, adjacent vanes being in overlapping relation and together forming a truncated funnel which directs the liquid in a downwardly convergent path of flow about and inwardly through the openings 15. If desired, the fingers may carry an annularly continuous thin and flexible material, instead of the sectional or individual vanes.

The trap 20 preferably is removably secured to the instrument housing in order that the trap may be stripped off when the instrument is to be removed from the well, thereby avoiding the resistance or other difficulties that might be encountered in attempting to remove the assembly against such obstructions as irregularities in the wall of the casing 24 within which the instrument ordinarily will be run. For this purpose the sleeve 21 may frictionally engage the housing surface to which it is applied, with sufficient snugness to prevent the trap from dropping off until it is to be intentionally removed. Where the fingers 22 are secured to the sleeve by rivets, the heads 25 of the rivets may be received within longitudinal recesses 26 in the housing surface, thus keying the trap and housing together for straight relative longitudinal movement. When the instrument is run into the well, the trap 20 will be carried in the position illustrated in Fig. 1. Upon arrival of the assembly at the working depth, the instrument is operated to record the velocity of the well liquid flowing inwardly through openings 15 against the rotor while the instrument is held on stationary position, or perhaps under some circumstances while the instrument is being moved vertically in the well with the resultant recording of the relative velocity of the instrument travel and well liquid flow. Upon completion of the determination, the trap 20 may be stripped from the instrument simply by pulling up the latter while the trap is held against an irregularity inside the casing. Ordinarily one side of the trap will lay against the casing so that when pulled up to the location of a joint 27, the trap will engage against the pipe shoulder 28, permitting the instrument to be pulled out of the sleeve 21.

As previously indicated, it may be desirable to equip the instrument for determination during a single run into the well, of both downward and upward liquid velocities. For this purpose I may employ a combination of traps in an assembly as indicated in Fig. 4, and comprising a lower trap structure generally indicated at 29 cooperating with an upper trap 30 essentially similar to the previously described form. The lower trap 29 is more particularly dealt with in my copending application Ser. No. 65,018, filed on even date herewith.

Referring to Fig. 3, trap 29 comprises a tubular body structure 31 having a top ring section 32, counterbore 33 which may receive the lower end of the instrument housing 11 for attachment by set screw 34. Depending within ring 32 and held by set screw 35 is a tubular section 36 having at its lower end, an external inwardly inclined shoulder 37. Section 36 is surrounded by a sleeve 38 held in place by set screw 39, and containing circularly spaced slots 40 alined with internal grooves 41 and also with lower relatively wider slots 42.

Slots 42 receive the upper end portions 43 of a circular series of uniformly spaced fingers 44 which in expanded condition, extend downwardly and outwardly as illustrated in Fig. 3. The fingers are notched at 45 to form shoulders 46 bearing on the tube section shoulder 37 to support the fingers for radial swinging movement. The fingers are yieldably maintained in expanded positions by leaf springs 47 extending within grooves 41 and slots 40 and bearing their lower ends against portions 43 of the fingers.

Secured to the inside of each of the fingers 44 is a thin flexible metallic vane 48, adjacent vanes being in circularly overlapping relation so that together the vanes form a downwardly flared truncated funnel serving to direct liquid flow upwardly across a relatively large area, into the instrument housing inlet 14 and against the rotor 16.

Referring to Fig. 4, the flexible fingers 49 of the upper trap 30 are shown to be attached to a sleeve or keeper 50 adapted to be slid up over the lower trap so as to confine it in radially contracted condition, the sleeve being sufficiently extended upwardly of the lower trap, as to bring the mouth of trap 30 in such proximity to the openings 15 as to effectively direct down flowing liquid into the openings and against the rotor 16.

In considering the operation of the instrument with respect to the use of the dual trap assembly, assume the instrument to be run in the well with the traps assembled as shown in Fig. 4. At the proper depth, measurements of downward liquid velocity in the well may be taken by reason of the initial expanded condition of the upper trap 30. After such determinations are made and it may then be desired to measure upward flow rates, the edge of the trap 30 may be pulled up against the casing shoulder 28 and sleeve 50 stripped from the instrument to release the lower trap 29 for expansion to the condition of Fig. 3. Thereupon, the instrument becomes conditioned for determination of upward flow velocities.

I claim:

A well flow meter comprising a housing adapted to be lowered in the well liquid, a rotor in the housing and exposed to the liquid for rotation by and in accordance with the liquid flow through a passage in the housing, recording means in the housing energized in accordance with rotations of the rotor, an upper upwardly cupped trap carried by the housing and adapted to direct downwardly flowing well liquid into said passage and against the rotor, a lower trap carried by the housing having a downwardly cupped condition for directing upwardly flowing liquid into the passage and against the rotor and adapted for radial contraction from said condition, and a keeper carried by said upper trap extending about the lower trap and maintaining it in radially constricted condition while the housing is being lowered in the well, said housing and lower trap being movable upwardly relative to said upper trap and keeper, and the lower trap being withdrawable from the keeper by said upward movement to free the lower trap for radial expansion, and said upper trap and keeper having means engageable with an irregularity in the well bore wall to retain the upper trap and keeper against upward movement during said withdrawal of the lower trap.

CLARENCE R. DALE.

References Cited in the file of this patent

UNITED STATES PATENTS

| Number | Name | Date |
|---|---|---|
| 1,406,682 | Rathbone | Feb. 14, 1922 |
| 1,440,778 | Foster | Jan. 2, 1923 |
| 2,117,538 | Baker | May 17, 1938 |
| 2,187,483 | Baker | Jan. 16, 1940 |
| 2,333,164 | Fisher | Nov. 2, 1943 |
| 2,348,192 | Chambers | May 9, 1944 |
| 2,379,138 | Fitting, Jr. et al. | June 26, 1945 |
| 2,460,561 | Winkelman | Feb. 1, 1949 |
| 2,593,285 | Fay et al. | Apr. 15, 1952 |